UNITED STATES PATENT OFFICE.

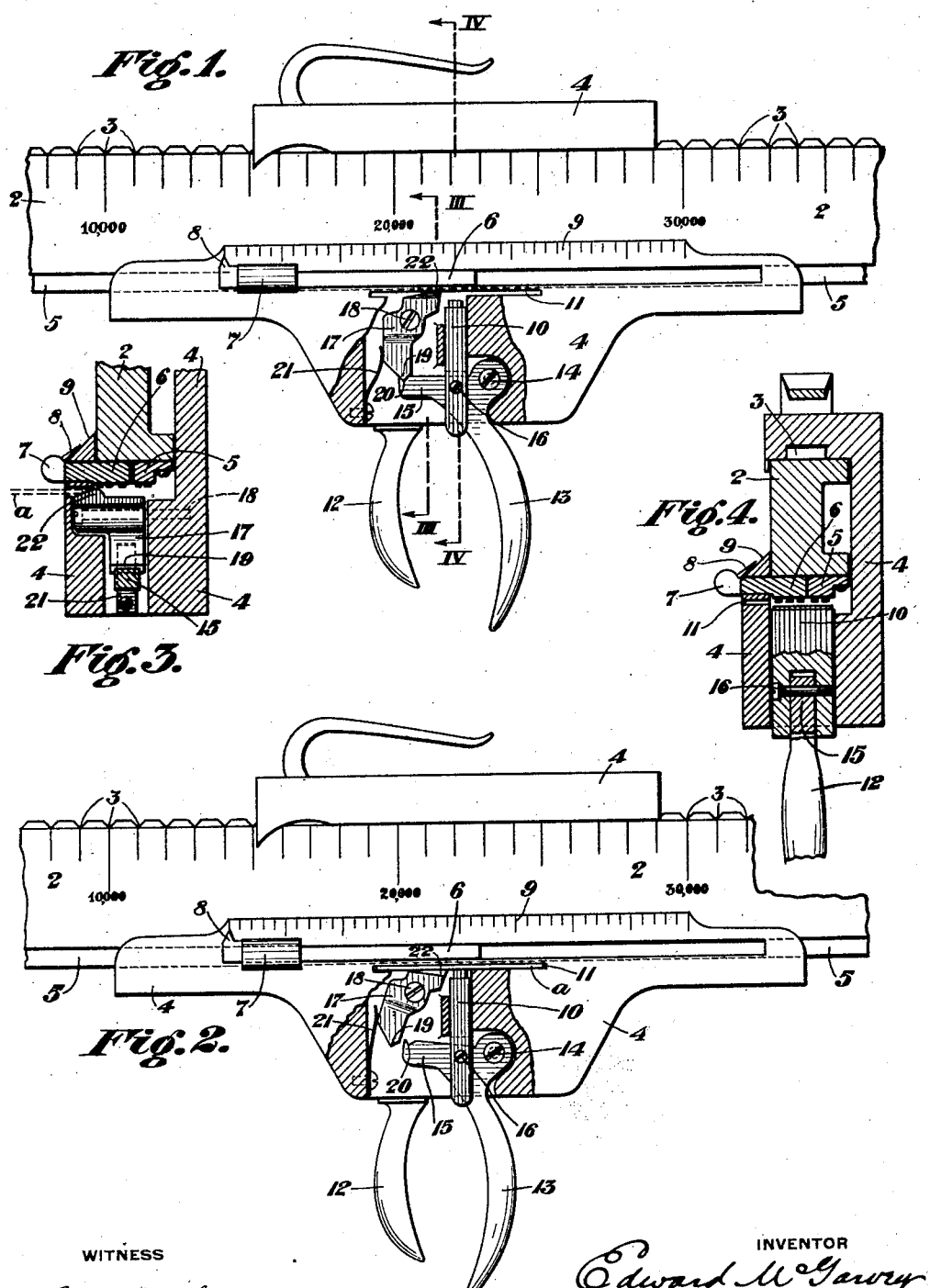

EDWARD McGARVEY, OF BEAVER FALLS, PENNSYLVANIA, ASSIGNOR TO STANDARD SCALE & SUPPLY COMPANY, OF PITTSBURGH, PENNSYLVANIA, A CORPORATION OF DELAWARE.

SAFETY-LATCH FOR RECORDING SCALE-BEAMS.

1,378,966. Specification of Letters Patent. Patented May 24, 1921.

Application filed January 26, 1920. Serial No. 354,018.

*To all whom it may concern:*

Be it known that I, EDWARD McGARVEY, a citizen of the United States, residing at Beaver Falls, in the county of Beaver and State of Pennsylvania, have invented certain new and useful Improvements in Safety-Latches for Recording Scale-Beams, of which the following is a specification.

My invention is an improvement in the class of weighing scale beam in which the weight is recorded by imprinting on a card. In such scales, the beam and poise of the scale are usually provided with type arranged in conformity with the successively indicated weights and pressing mechanism carried by the poise adapted to bring an inserted card into contact therewith. It is also desirable to provide means for printing both the gross and tare weights.

In apparatus of this kind it is desirable that the printing operation shall not be performed until the card is first inserted between the type and the pressing platen, as otherwise the type may be damaged. My invention provides means to prevent such occurrence, together with other useful and desirable advantages.

In the drawings which show one preferred embodiment of the invention:

Figure 1 is a view in elevation, partly in section, showing a portion of a scale beam and the poise thereon provided with my improvement, in normal position;

Fig. 2 is a similar view illustrating the device in operation;

Fig. 3 is a cross sectional view on line III—III of Fig. 1; and

Fig. 4 is a cross section on the line IV—IV of Fig. 1.

In the drawings, 2 is the usual scale beam of a platform scale of any standard construction with the customary series of serrations 3 and corresponding weight indicating subdivisions, for coöperation with the shifting poise 4, the construction of which as to its well known usual functions is well understood by those skilled in the art. Along the under side of the scale beam 2 is a type bar 5 provided with series of progressively arranged printing type representing in figures, and adapted to reproduce at varying successive positions, indicating marks upon a printed card, in conformity with the particular weight to be ascertained at any of the several operative positions of the poise 4.

Slidably mounted in the poise is a secondary type bar 6 having sub-divisional series of coöperating type, adapted to be adjusted in conformity with an operating terminal 7 having an indicating pointer 8, capable of being set for sub-divisional weight adjustments with relation to the subscale 9 on the face of the main poise, as will be readily understood.

The printing operation is performed by means of a vertically adjustable printing platen 10 mounted in a suitable guideway in the poise and adapted to thrust a recording card *a* upwardly against the particular set of type to be utilized for recording the specific weighing operation, which card is inserted across between the type and the operating terminal of the platen in a receiving slot 11, arranged transversely through the front portion of the poise.

The poise is provided with a pair of gripping handles 12 and 13 respectively, handle 12 being rigidly connected with the under side of the poise as shown, and handle 13 being pivoted by a stud screw 14 in the manner of a trigger in a suitable cavity within the lower dependent portion of the poise. Platen 10, which may be bifurcated as shown, is pivotally connected with the upper lever portion 15 of handle 13 by a pivoting pin 16, so that when the handle 13 is gripped and drawn toward stationary handle 12, the platen will be thrust upwardly, effecting a printing operation upon the card, and will lower by gravity or spring action, as desired, when the handles are released.

The feature of the invention involved herein is designed for the purpose of preventing undesired pressing action of the platen 10, by an interlock device capable of being automatically disengaged upon insertion of the card into and across the slot 11 and the inner space between the printing type and the upper terminal of the platen. For such purpose, I provide a trigger sear or dog 17 pivoted at 18, having a lower locking terminal 19 adapted to engage a corresponding holding notch 20 at the end of lever portion 15 of handle 13. A spring 21 tends to thrust the dog over into operative engagement with the lever arm, as in Fig. 1, when in normal position.

At its upper portion, dog 17 is provided with an upwardly projecting rounded or sloping terminal 22 inclined upwardly from the outer entering slot portion for the card and adapted to be depressed by insertion of the card inwardly of the slot, so as to thrust the locking terminal 19 outwardly from engagement with notch 20, as clearly shown in Fig. 2. Thereupon, the card having been inserted to the proper distance between the type and the platen, the latter may be raised to perform the desired printing operation without danger of injury to either because of the intervening card, and upon withdrawal of the card, the dog 17 will, by action of light spring 21, return to its normal locking position.

The construction and operation of the invention will be readily understood and appreciated from the foregoing description. In the normal operation of beam scales of this type, the balancing of the beam movement and adjustment of the poise is performed before the recording card is inserted in the receiving slot. The printing operation as above described is then performed, and if it is desired to make a record of both the gross and tare weight, the poise may be again adjusted and a second similar operation performed, it being understood that the card is to be shifted edgewise a corresponding position to receive the second impression.

The construction of the device is comparatively simple and very efficient and reliable. It obviates the undesired risk of damaging the printing mechanism, the action is largely automatic, and obviates the necessity of skilled labor or troublesome computations. The device may be variously changed or modified in construction, design, or various details by the skilled mechanic, to adapt it to different standard scale mechanism, but all such changes are to be considered as within the scope of the following claims.

What I claim is:

1. In a recording scale beam having a printing platen and a card receiving cavity; means for actuating the platen and a device mounted in operative relation to such cavity for locking and unlocking the platen actuating means.

2. In a recording scale beam having a printing platen and a card receiving cavity; means for actuating the platen and a pivoted dog engaging the platen actuating means and having a portion extending across the card receiving cavity.

3. In a recording scale beam having a printing platen and a card receiving cavity; a platen actuating lever and a pivoted dog engaging said lever and having a depressing portion extending across the said receiving cavity.

4. A poise for a recording scale beam having a card slot and a printing platen, a lever for the platen having a locking portion, and a pivotally mounted locking dog having a locking projection for the lever and a depressing portion extending across the path of movement of a card when inserted through the card receiving cavity.

5. A poise for a recording scale beam having a card slot and a printing platen, a lever for the platen having a locking portion, a pivotally mounted locking dog having a locking projection for the lever and a depressing portion extending across the path of movement of a card when inserted through the card receiving cavity, and a retracting spring for said dog.

6. In combination with a scale beam having fixed type thereon, a poise having a supplemental adjustable type bar, a printing platen, a lever therefor, a card insertion slot, and a locking dog for the platen lever having a portion extending across the path of movement of a card when inserted through the card slot.

In testimony whereof I hereunto affix my signature.

EDWARD McGARVEY.